United States Patent [19]

Horowitz

[11] Patent Number: 4,747,364

[45] Date of Patent: May 31, 1988

[54] FLOW RATE THRESHOLD SENSOR

[75] Inventor: Barry N. Horowitz, Las Vegas, Nev.

[73] Assignee: Filter Alert Corporation, Las Vegas, Nev.

[21] Appl. No.: 893,204

[22] Filed: Aug. 5, 1986

[51] Int. Cl.⁴ .............................................. G01L 19/12
[52] U.S. Cl. ..................... 116/268; 116/267; 116/DIG. 25; 116/70; 55/274; 55/DIG. 34
[58] Field of Search ............... 116/24, 70, 112, 137 R, 116/138, 141, 264, 266–268, 272, DIG. 25, 67 R; 55/274, DIG. 34; 446/170, 180, 188, 195, 196, 204, 205–207, 216

[56] References Cited

U.S. PATENT DOCUMENTS

| Re. 28,268 | 10/1974 | Autrand | 116/67 R |
|---|---|---|---|
| 2,721,533 | 10/1955 | Alderfer | 116/112 |
| 2,753,831 | 7/1956 | Davies | 116/112 |
| 2,782,747 | 2/1957 | Alderfer | 116/112 |
| 2,804,839 | 9/1957 | Hallinan | 116/112 |
| 3,027,865 | 4/1962 | Kautz et al. | 116/268 |
| 3,529,407 | 9/1970 | Nowicki | 55/274 |
| 3,635,001 | 1/1972 | Komroff | 55/274 |
| 3,736,900 | 6/1973 | Nowicki | 116/70 |
| 3,916,817 | 11/1975 | Kemp | 116/70 |
| 4,091,762 | 5/1978 | Ruehl | 116/70 |
| 4,321,070 | 3/1982 | Bede | 116/70 |
| 4,520,748 | 6/1985 | Frano et al. | 116/70 |

FOREIGN PATENT DOCUMENTS 2410497  8/1979  France ................... 55/274

Primary Examiner—William A. Cochlinski, Jr.
Assistant Examiner—W. Morris Worth
Attorney, Agent, or Firm—Cahill, Sutton & Thomas

[57] ABSTRACT

A flow rate sensor for use with an air filter channels air flow to energize an audible sound generator upon development of an air pressure differential within the sensor above a settable threshold, which pressure differential results from a reduction in the air flow rate through the air filter due to clogging of the air filter by filtered matter.

14 Claims, 2 Drawing Sheets

U.S. Patent    May 31, 1988    Sheet 1 of 2    4,747,364
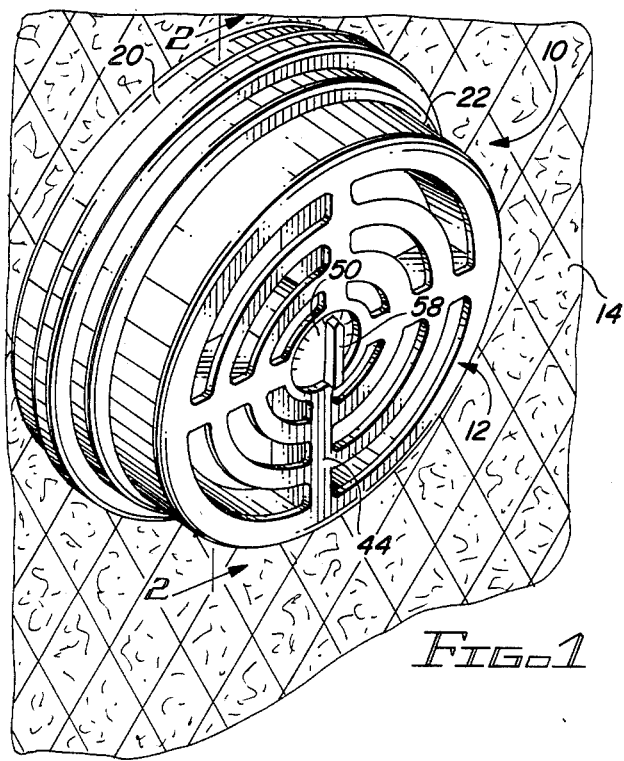
Fig. 1
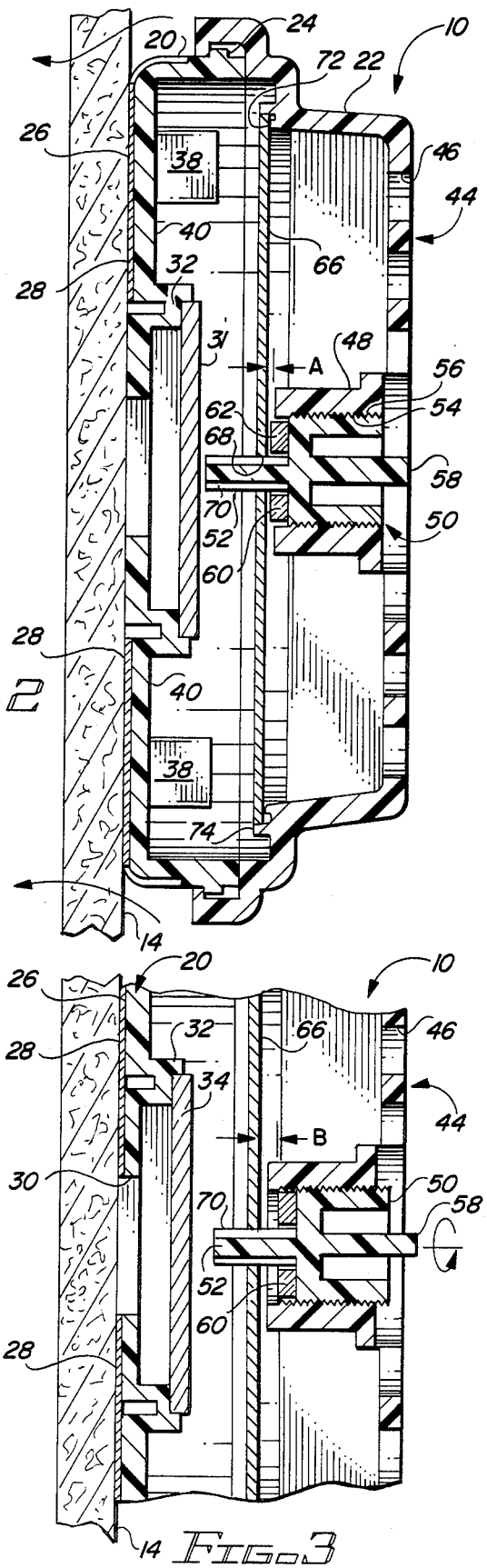
Fig. 2
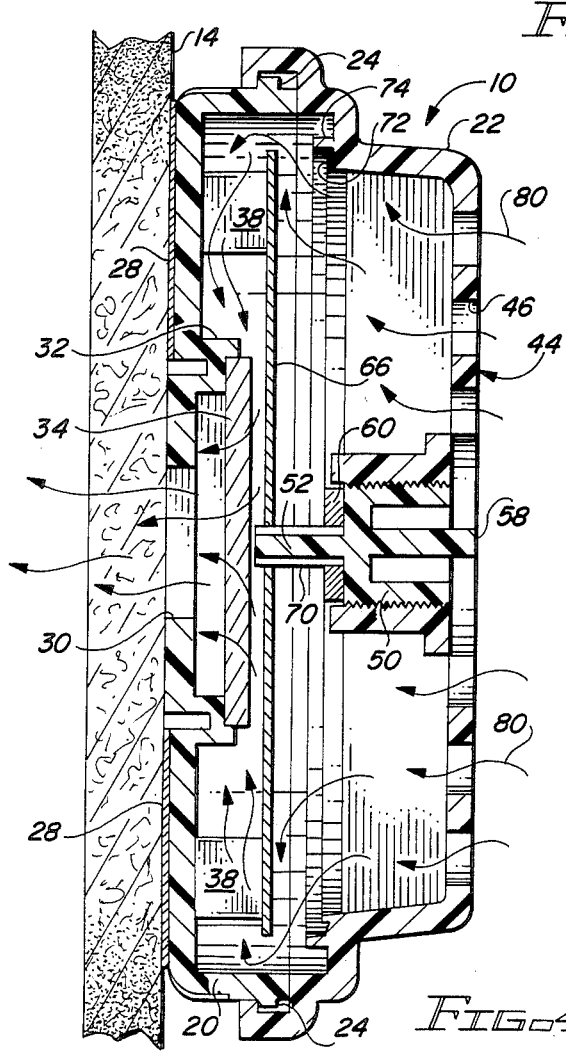
Fig. 4
Fig. 3

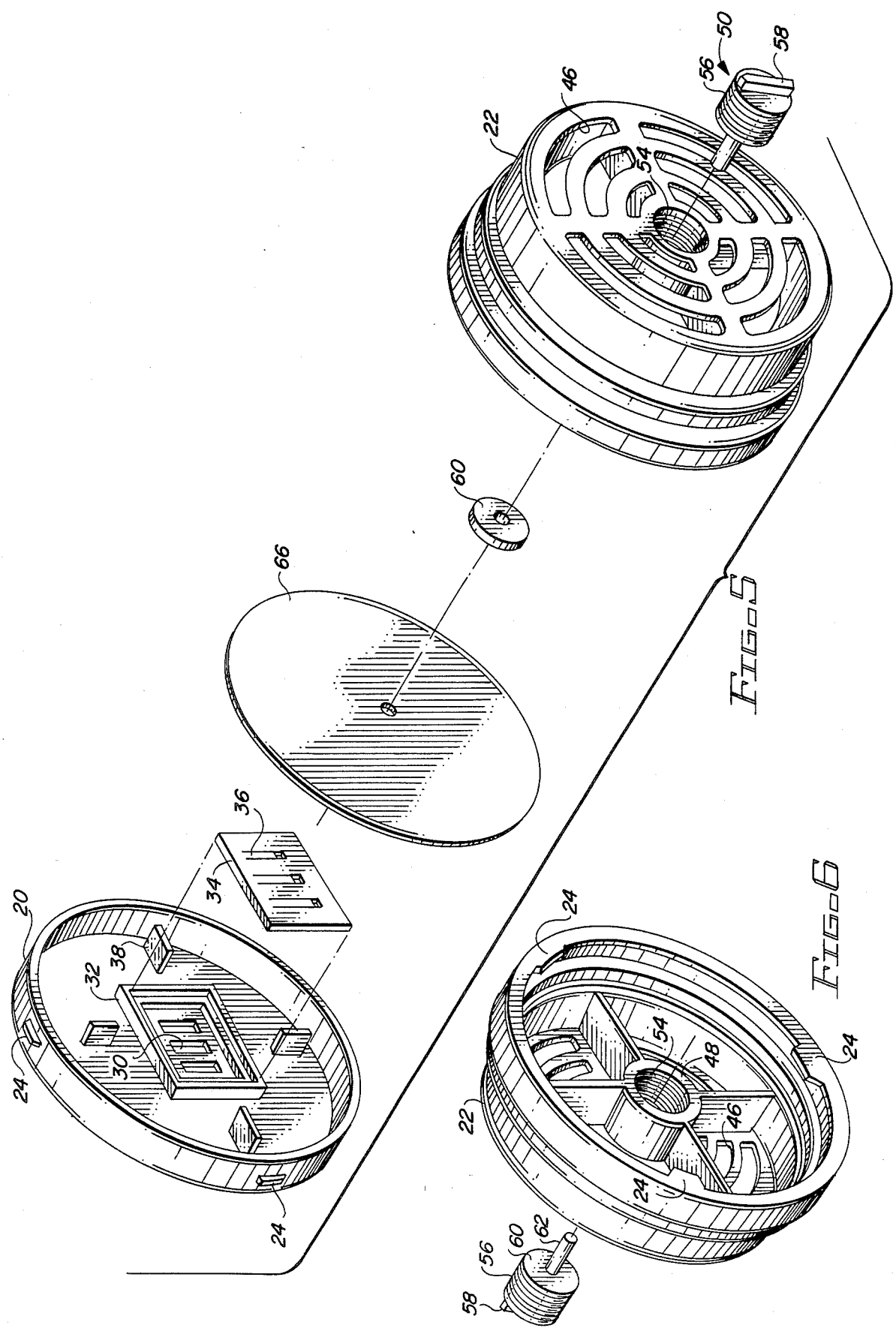

FLOW RATE THRESHOLD SENSOR

FIELD OF THE INVENTION

The present invention relates to sensors and, more particularly, to air flow rate threshold sensors.

BACKGROUND OF PRIOR ART

Environmental control systems for dwellings and commercial establishments invariably include heating and air conditioning systems for modulating the temperature of the enclosed air. Furthermore, such systems also include filtration means for removing particulate matter from the heated or cooled air. Such filtration means, particularly for dwellings, include mechanical filters formed of entwined or interwoven fibrous materials.

These fibrous materials serve the function of mechanically blocking flow of particulate matter as the air flowing therethrough flows along a circuitous path. The particulate matter becomes attached to individual fibers and, over a period of time, progressively restricts the air flow paths. The pressure differential between the inflow and outflow sides of the air filter increases as a function of the quantity of particulate matter filtered by the filter and retained on the air filter fibers. Simultaneously, a reduction of the air flow rate through the filter occurs.

The effects of a contaminated or partially clogged air filter are many-fold. The air flow rate is diminished which reduces the effective heating or cooling of the dwelling or commercial establishment. The partially clogged filter tends to increase the back pressure applied to the blower or fan which generates the air flow; such back pressure increases the work which must be performed and the energy consumed by the blower or fan unit. The increased work load increases the wear rate and operating costs increase.

Various devices have been developed over the years to provide a determination or reminder to a user of the need for replacement of an air filter in an heating and air conditioning unit. In each of U.S. Pat. Nos. 2,753,831 and 4,321,070 there is describd a tube which extends through an air filter and incorporates a whistle. In operation, air flows continuously through the tube and as the air flow threthrough increases as a result of increasing clogging of the air filter, the whistle generates a sound when the air flow rate is of a sufficient magnitude. As air flows continuously through the tube, some contamination and clogging of the tube will inherently occur and may have a negative effect upon the operation of the whistle. U.S. Pat. No. 2,804,839 is directed to a device for providing a visual and audible signal indicative of the clogging of an air filter. The device is a highly complex mechanical device; it includes a magnet for retaining in place a pivotable member which member provides a visually perceivable indication and actuates further structure capable of energizing an audible alarm. Moreover, the device is self-resettable as a result of complex interrelated mechanical movements which become operable upon replacement of the air filter. U.S. Pat. No. 3,916,817 is directed to a pivotally mounted disc movable against the action of a spring in response to a pressure differential of a predetermined value to provide a visually perceivable indication reflective of repositioning of the disc. U.S. Pat. No. 3,027,865 is directed to a device having a diaphragm responsive to creation of a partial vacuum for providing a visual indication and for closing a pair of contacts to energize an electric signal. U.S. Pat. No. 2,721,533 is directed to an air blower wall mounted alarm having a continuous flow of air therethrough during normal operation; upon an increase in air flow resulting from a clogged air filter, a vibrating reed becomes energized to generate an audible signal, The operating threshold may be modified by adjusting the air inlet size. U.S. Pat. No. 2,782,747 is directed to a device penetrably attached to the wall of a blower system for providing a reed generated audible signal upon an increased air flow therethrough due to a clogged air filter associated with the blower system. U.S. Pat. No. 3,736,900 is directed to a reed operated device for producing an audible signal as a result of clogging of an air cleaner filter associated with the carburetor of an internal combustion engine.

DISCLOSURE OF THE INVENTION

The sensor includes a magnetically retained disk, which disk in combination with a cap of the sensor, defines a first chamber having an air pressure commensurate with that of the upstream side of an associated air filter. A second chamber defined by the disk and the base of the sensor is in fluid communication through an aperture in the base with the downstream side of the air filter to establish within the second chamber an air pressure commensurate with that present at the downstream side of the disk. Upon development of a sufficient pressure differential between the first and second chambers, the disk will be displaced from the magnet and permit air flow from the first chamber to the second chamber in response to the pressure differential. Air flow responsive needs extend across the aperture in the base and become energized in response to air flow through the aperture to provide an audible tone indicative of the pressure differential threshold being exceeded. Means are provided to alter the degree of magnetic force acting upon the disk and to permit altering the threshold level.

It is therefore a primary object of the present invention to provide a threshold pressure sensitive device for generating an indication of a predetermined degree of clogging of an operatively associated air filter.

Another object of the present invention is to provide a warning device for use with an air filter which, during normal operation, is not contaminated by air laden with particulate matter.

Yet another object of the present invention is to provide a device having a settable threshold for sensing and indicating a predetermined state of pressure differential across an air filter.

Still another object of the present invention is to provide a pressure sensitive sensor used with an air filter for indicating an exceeded air pressure threshold.

A further object of the present invention is to provide a magnetically retained disk for energizing an audible tone generator in response to an exceeded pressure differential threshold across the disk.

A yet further object of the present invention is to provide an inexpensive sensor for use with an air filter to sense a change in air flow rate through the air filter.

A still further object of the present invention is to provide a cleanable sensor for sensing an unacceptable airflow rate through an air filter used in an heating and air conditioning system.

These and other objects of the present invention will become apparent to those skilled in the art as the description thereof proceeds.

BRIEF DESCRIPTION OF THE DRAWINGS

The present invention will be described with greater specificity and clarity with reference to the following drawings, in which:

FIG. 1 is a perspective view of the sensor secured to a representative air filter;

FIG. 2 is a cross sectional view taken along the lines 2—2, shown in FIG. 1;

FIG. 3 is a partial cross sectional view;

FIG. 4 illustrates the air flow path through the sensor on actuation of the sensor;

FIG. 5 is an exploded isometric view of the major components of the sensor; and

FIG. 6 is a perspective view of the interior of a part of the sensor.

DESCRIPTION OF THE BEST MODE OF THE INVENTION

Referring to FIG. 1 there is shown an air filter 10 of a conventional type used in dwellings and many business establishments. That is, it consists of a pad of fibrous material disposed between opposed apertured retaining elements. Such a filter is generally used with heating and cooling units to filter particulate matter from the heated or cooled air. the filtered particulate matter becomes entangled with and lodged upon the fibrous material of air filter 10. Over a period of time, the air pathways through the air filter become more and more obstructed by the filtered particulate matter. Such increasing obstruction will produce a commensurate increase in the pressure differential between the upstream and downstream sides of the filter. The increased pressure differential will reduce the air flow rate through the filter and produce commensurately less heating and cooling of the dwelling or commercial establishment with which the air filter is associated. Moreover, the filter will create a back pressure for the blower unit associated with the heating or cooling system and result in greater energy consumption.

It is therefore prudent to replace air filter 10 from time to time to prevent it from becoming sufficiently clogged to restrict the air flow rate therethrough by more than an acceptable and predeterminable amount. As such clogging is a function of the amount of particulate matter suspended or entrained within the air and as the latter is a function of the nature and quantity of activity within the area to be heated or cooled, no accurate predictions for filter replacement intervals can be made. It is therefore preferable to provide a signaling device for automatically providing an indication at such time as air filter 10 becomes clogged sufficiently to limit the air flow rate therethrough to a predeterminable valve.

A sensor 12 for sensing the flow rate through air filter 10 and for providing an indication of such flow rate above or below a settable threshold is depicted in FIG. 1. The sensor is directly attachable to the upstream surface 14 of air filter 10. The purpose and function of sensor 12 is that of sensing the pressure differential between the upstream and downstream side of air filter 10 and in response to such pressure differential emit an alerting signal indicative of the pressure differential exceeding a predetermined threshold; the latter being indicative of a reduced air flow rate through the air filter 10.

The structure of sensor 12 will be described with joint reference to FIGS. 2, 5 and 6. Sensor 12 is formed by a base 20 and a detachably attachable cap 22. The attachment means for attaching th cap to the base may be a conventional push and twist mechanism 24 disposed at four locations about the perimeter of the base and the cap. The base includes an annular planar section 26, which section may be used to secure the base to surface 14 of air filter 10. The means for securing the sensor may be segments of hook and loop tape, such as the two part tape sold under the registered trademark "VELCRO". Other means, such as prongs for penetrable engagement with the fibers of the air filter, adhesives, and the like may be employed. An aperture 30 is centrally located in base 20 to provide a path for fluid communication from within sensor 12 to and through air filter 10. A wall 32 for supporting a reed plate 34 circumscribes aperture 30. The reed plate includes one or more reeds 36, which reeds are vibratorily responsive to air flow therepast. The resulting vibration of reeds 36 will produce an audible tone. By selecting the number, size and length of reeds, a harmonious or discordant tone can be generated. A plurality of stanchions 38 extend from bottom surface 40 of base 20 to an elevation above the elevation represented by reed plate 34 mounted on wall 32.

Cap 22 includes an inlet section 44 having a plurality of concentric arcuate segments 46 for permitting passage of air therethrough into sensor 12. An hollow internally threaded boss 48 extends inwardly from approximately the center of inlet section 44. A threaded plug 50, having a centrally located mandrel 52, includes threads 54 for engaging threads 56 of boss 48. Plug 50 also includes an indicator 58 for providing a visual indication of the position of rotation of the plug and serves as a means for gripping the plug to rotate it into and out of threaded engagement with boss 38.

Mandrel 52 penetrably supports an annular magnet 60, which magnet is adhesively or otherwise secured to annular surface 62 of plug 50. The mandrel also penetrably supports a disk 66 by penetrable engagement with aperture 68 of the disk. As illustrated, a sleeve 70 may be enlarged about mandrel 52 to serve as a bearing surface for the apertured disk and the magnet.

In a first position, the disk is further supported by an annular rim 72 formed in cap 22. An annular flange 74 may also be incorporated to position the disk in the first position and assist in developing a seal beween the disk and cap 22. In a second position of disk 66, it is supported upon each of stanchions 38, which stanchions limit further movement of disk 66 toward reed plate 34 and maintain it positionally removed and out of contact with the reed plate. mandrel 52 restrains lateral movement of disk 66 and limits the movment of the disk along the longitudinal axis of the mandrel.

By examination, it will become apparent that segments 46 of inlet section 44 are subject to an air pressure essentially equivalent to that of the upstream side of filter 10. Hence, the space defined within cap 22 intermediate the inlet section and disk 66 is an equivalent air pressure. Aperture 30, being adjacent air filter 10 and essentially in direct fluid communication with the equivalent downstream surface of air filter 10 is at a pressure equivalent to the pressure attendant the downstream side of the air filter. The pressure on the downstream side of air filter 10 is translated through aperture 30 into the space within sensor 12 defined by base 20 and disk 66. Any pressure differential present across air filter 10 therefore exists across disk 66. That is, any such pressure differential will result in a pressure or force acting upon the upstream side of the disk, which pressure will tend to translate the disk toward aperture 30 along the axis of mandrel 52. By making disk 66 of magnetically responsive material, the disk will be attracted to magnet 60 and resist translation along mandrel 52. Such translatory repositioning will be resisted until the force acting upon the disk as a result of the above described pressure differential is sufficient to overcome the magnetic attraction produced by magnet 60. When the magnetic attraction is overcome, disk 66 will be repositioned toward and to stanchions 38 to the second position, as illustrated in FIG. 4. In this position, air, as represented by arrows 80, will flow into cap 22 through segments 46, about the perimeter of disk 66 into base 20, past stanchions 36 to reed plate 34, past reeds 36 to and through aperture 30 and into air filter 10. Such air flow past reeds 36 will produce an audible tone, which may be melodious or discordant. The resulting audible signal will provide an operator with a continuing reminder that air filter 10 has become sufficiently clogged to warrant replacement.

Upon replacement of the air filter, sensor 12 may be readily detached from the air filter and reattached to a new filter by use of tape 28 or other attachment means. By inspection, it will be apparent that sensor 12 can be non-destructingly dismounted for cleaning of the various stationary and movable elements. Thereby, the useful life of the sensor can by greatly extended. Alternatively, as the cost of sensor 12 is very low, it may, under certain conditions, be discarded with the air filter.

To provide versatility in use of sensor 12, means are incorporated to permit setting of the pressure differential threshold across disk 66 which will be necessary to reposition the disk and energize reeds 36. Such adjustment is effective by rotating plug 50. Rotation of the plug will relocate magnet 60 closer to or further from disk 66 when the latter is in it's first position adjacent rim 72. The further away from the disk that the magnet is, the less will be the differential pressure threshold required to reposition the disk to it's second position. For convenience, indicator 58 may include indicia disposed upon cap 22, which indicia may be calibrated to pressure differential values.

While the principles of the invention have now been made clear in an illustrative embodiment, there will be immediately obvious to those skilled in the art many modifications of structure, arrangement, proportions, elements, materials, and components, used in the practice of the invention which are particularly adapted for specific environments and operating requirements without departing from those principles.

I claim:

1. A sensor for generating an audible tone upon the presence of a pressure differential in excess of a predetermined threshold across an air filter having an upstream side and a downstream side, said sensor comprising in combination:
   (a) means for securing said sensor to the upstream side of the air filter;
   (b) a first chamber within said sensor for sensing and containing an air pressure equivalent to that present at the upstream side of the air filter;
   (c) a second chamber within said sensor for sensing and containing an air pressure equivalent to that present at the downstream side of the air filter;
   (d) a disk translatable from a first position to a second position within said sensor in response to a predetermined pressure differential threshold between the pressures within said first and second chambers;
   (e) means for restraining translation of said disk until the pressure differential threshold between said first and second chambers is exceeded;
   (f) means for channeling a flow of air from said first chamber through said second chamber in response to translation of said disk; and
   (g) means for generating an audible tone in response to the flow of air through said second chamber;
   whereby, the audible tone provides an indication of the existence of a pressure differential across the air filter in excess of a predetermined threshold.

2. The sensor as set forth in claim 1 wherein said disk is magnetically responsive and wherein said restraining means includes a magnet for magnetically attracting said disk.

3. A sensor for generating an audible tone upon the presence of a pressure differential in excess of a predetermined threshold across an air filter having an upstream side and a downstream side, said sensor comprising in combination:
   (a) means for securing said sensor to the upstream side of the air filter;
   (b) a first chamber within said sensor for sensing and containing an air pressure equivalent to that present at the upstream side of the air filter;
   (c) a second chamber within said sensor for sensing and containing an air pressure equivalent to that present at the downstream side of the air filter;
   (d) a magnetically responsive disk translatable from a first position to a second position within said sensor in response to a predetermined pressure differential threshold between the pressures within said first an second chambers;
   (e) means for translating said disk, said translating means including a mandrel for translating the disk along the longitudinal axis of said mandrel and an aperture disposed in said disk for penetrably receiving said mandrel;
   (f) means for restraining translation of said disk until the pressure differential threshold between said first and second chambers is exceeded, and restraining means including a magnet for magnetically attracting said disk;
   (g) means for channeling a flow of air from said first chamber through said second chamber in response to translation of said disk; and
   (h) means for generating an audible tone in response to the flow of air through said second chamber;
   whereby, the audible tone provides an indication of the existence of a pressure differential across the air filter in excess of a predetermined threshold.

4. The sensor as set forth in claim 3 including means for repositioning said magnet relative to the first position of said disk to alter the restraining force acting upon said disk.

5. The sensor as set forth in claim 3 wherein said translating means includes a plug in engagement with said sensor, means for securing said magnet to said plug and wherein said mandrel extends from said plug.

6. The sensor as set forth in claim 5 including threaded means for engaging said plug with said sensor and means for indicating the degree of engagement of said plug with said sensor as a function of the restraint provided by said restraining means.

7. The sensor as set forth in claim 3 wherein said second chamber includes an aperture for exhausting the flow of air through said second chamber and wherein said generating means comprises a least one reed responsive to the air flow through said aperture for generating the audible tone.

8. The sensor as set forth in claim 7 wherein said generating means comprises a plurality of reeds for generating a plurality of cones in response to the air flow.

9. The sensor as set forth in claim 7 including a plate secured within said second chamber for supporting at least one of said reeds.

10. The sensor as set forth in claim 1 wherein said second chamber includes an aperture for exhausting the flow of air through said second chamber and wherein said generating means comprises at least one reed responsive to the air flow through said aperture for generating the audible tone.

11. The sensor as set forth in claim 3 wherein said generating means comprises a plurality of reeds for generating a plurality of tones in response to the air flow.

12. The sensor as set forth in claim 1 including means for varying the degree of restraint provided by said restraining means against movement of said disk.

13. A method for generating an audible tone upon the presence of a pressure differential in excess of a predetermined threshold air pressure across an air filter having an upstream side and a downstream side, said method comprising the steps of:
 (a) sensing the air pressure attendant the upstream side of a the air filter and applying it to one side of a two sided disk;
 (b) sensing the air pressure attendant the downstream side of the air filter and applying it to the other side of the disk;
 (c) translating the disk from a first position to a second position in response to a pressure differential present across the disk which is greater than a predetermined pressure differential threshold;
 (d) restraining translatory movement of the disk from the first position to the second position as a function of the pressure differential threshold;
 (e) accommodating a flow of air in response to the pressure differential subsequent to translation of the disk from the first position to the second position; and
 (f) generating an audible tone in response to the air flow indicative of the pressure differential threshold being exceeded.

14. The method as set forth in claim 13 including the step of modifying exercise of said restraining step as a function of altering the pressure differential threshold.

* * * * *